Patented Sept. 3, 1946

2,407,066

UNITED STATES PATENT OFFICE 2,407,066

PROCESS FOR MANUFACTURING FUROIC ACID AND FUROIC ACID SALTS

Andrew P. Dunlop, Riverside, Ill., assignor to The Quaker Oats Company, Chicago, Ill., a corporation of New Jersey No Drawing. Application June 29, 1942, Serial No. 449,032

11 Claims. (Cl. 260—345)

This invention relates to an improved process of producing furoic acid and furoic acid salts from furfural. More specifically it relates to a process of producing furoic acid and furoic acid salts by treating furfural with gaseous oxygen in contact with a catalyst.

An object of my invention is to produce furoic acid from furfural more economically than heretofore.

In the past furoic acid has been prepared from furfural by the use of gaseous oxygen as an oxidizing agent in contact with a catalyst composed predominantly of silver. While this method produces satisfactory yields of furoic acid, it is costly due to the nature of the catalyst.

Experience has shown that this type of catalyst easily becomes poisoned and inactive and is difficult, if not impossible, to reactivate without going through the steps of converting to silver nitrate and subsequent precipitation of silver oxide.

It is also known that furfural and other aldehydes may be oxidized in an alkaline medium to the corresponding acids by the use of silver oxide and cupric oxide, the oxygen necessary for the oxidation being supplied by the cupric oxide. The amount of aldehyde oxidized in this process is therefore dependent entirely upon the amount of cupric oxide employed. This limitation renders the process of little commercial value.

I have discovered that furoic acid may be prepared in substantially quantitative yields by oxidizing furfural with an oxygen-containing gas in an alkaline aqueous medium and in contact with a catalyst comprising predominantly a base metal oxide in admixture with a small amount of a noble metal oxide. Furthermore, in practicing my process I have discovered that the life of such a catalyst is unlimited due to its continuous regeneration by intimate admixture with oxygen. The amount of furfural oxidized is therefore dependent upon the amount of oxygen-containing gas used and not upon the quantity of catalyst used.

As the base metal oxide I have found oxides of copper, iron, cobalt, nickel, titanium, cerium, thorium, bismuth and antimony to be satisfactory. Typical of the noble metals, the oxides of which have proven efficient in my process, are silver, gold, platinum and palladium.

In general, according to one embodiment of this invention, my process is carried out as follows: The catalyst is prepared by mixing the base metal oxide and the noble metal oxide or salts of the metals which readily form the oxides. The oxide catalyst is suspended in water to which sodium hydroxide has been added and oxygen is intimately contacted with the catalyst either at atmospheric or superatmospheric pressure. Furfural is then added incrementally. When the reaction is complete, the catalyst is separated and the liquor acidified, preferably with sulfuric acid. Then the liquor is concentrated by a suitable method to a point at which, when hot, a substantial portion of the total sodium sulfate is precipitated while all the furoic acid remains in solution. At this point the precipitated sodium sulfate is removed by filtration or decantation and the mother liquor is cooled to yield furoic acid, substantially free from sodium sulfate.

The above indicated process may be varied in a number of ways. For instance, the catalyst may be suspended in water and the furfural added first and then the alkali. The furfural and alkali may be added simultaneously or alternately and in several ways, continuously, incrementally or all at one time but regardless of the method of addition, the medium must always be kept alkaline in order for the reaction to proceed. The furoic acid may be obtained after acidification of the liquor by solvent extraction with a solvent insoluble in water and capable of dissolving furoic acid, suitable solvents being furfural, dichloroethyl ether and ethyl ether. The liquor is acidified, preferably with sulfuric acid, and then extracted in a suitable manner with the solvent. The solvent layer containing the furoic acid is separated and the solvent removed by simple distillation, or preferably by steam distillation, in which case a concentrated aqueous solution of furoic acid is obtained. This is then cooled and the furoic acid separated. The mother liquor may be returned for further extraction with the solvent.

The oxidation reaction is exothermic and while I have operated at temperatures in the range 35–100° C., I prefer to carry out the process at approximately 50–55° C.

It has already been mentioned that it is essential that the oxidation of furfural by this process be carried out in an alkaline medium. While I prefer to use caustic alkali as the alkaline agent, I have found it possible to use other alkaline agents such as barium hydroxide or lime.

If all conditions are controlled properly during the reaction, the catalyst is ready for reuse at any time and its life is unlimited in my process. It is essential that there be adequate contact of oxygen with the catalyst at all times to insure continuous regeneration of the catalyst and rapid production of furoic acid. However, should conditions arise, such as the accidental interruption of the oxygen supply or too rapid addition of furfural, wherein the catalyst becomes inactive and will no longer catalyze the reaction, it may be regenerated in the process simply by allowing an excess of oxygen to accumulate or it may be regenerated separately by transferring it to an alkaline medium and dispersing a gas containing oxygen throughout the medium.

To illustrate my invention more clearly the following examples are given. It is not intended to limit the process to the amounts and kinds of materials or operating conditions described since the process can be practiced over wide limits both as to amounts and kinds of materials and operating conditions.

In the examples all proportions of materials used are expressed as parts by weight.

The ash content of the furoic acid isolated according to the following examples ranged from 2 to 3 per cent, unless otherwise stated.

EXAMPLE 1

Preparation of catalyst 110.45 parts of thorium nitrate
 ($Th(NO_3)_4.4H_2O$ C. P. crystals)
were heated in a casserole until no more nitrogen peroxide ($NO_2$) came off. The thorium oxide thus formed was suspended in 500 parts of boiling water containing 1.0 part of sodium hydroxide and to this was added, with stirring, 0.5 part of silver nitrate in 20 parts of water. The resulting precipitate was washed twice by decantation and used as a catalyst as described below.

Oxidation of furfural to furoic acid

The oxide catalyst prepared as described above was suspended in 500 parts of water and while oxygen was passed through continuously by means of a gas disperser, sodium hydroxide was added incrementally and the furfural was added continuously at the rate shown in the following table:

| Time in minutes | Temperature, degrees C. | NaOH added in parts | Total furfural added in parts |
|---|---|---|---|
| 0 | 42 | 1.4 | 0 |
| 8 | 47.5 | 1.4 | 3.25 |
| 14 | 51 | 1.4 | 6.50 |
| 21 | 53 | 1.4 | 9.75 |
| 28 | 54 | 1.4 | 13.00 |
| 34 | 56 | 1.4 | 16.25 |
| 41 | 56.5 | 1.4 | 19.50 |
| 47 | 56 | 1.4 | 22.75 |
| 54 | 57 | 1.4 | 26.00 |
| 60 | 56 | None | 29.25 |

After all the sodium hydroxide and furfural were added oxygen was passed through the medium for an addition 15 minutes. The reaction mixture contained sodium furoate which was converted to furoic acid by acidification with sulfuric acid. The yield of furoic acid isolated was 93 per cent of theory.

EXAMPLE 2

Preparation of catalyst 16.0 parts of titanium dioxide ($TiO_2$—Baker's purified) were suspended in 500 parts of water. To this was added 1 part of sodium hydroxide and the mixture was heated to boiling with rapid stirring. Then 0.5 part of silver nitrate in 20 parts of water was added. The precipitate was washed by decantation and used as a catalyst as indicated below.

Oxidation of furfural to furoic acid

The oxidation was carried out with the above catalyst in the same manner as described in Example 1. The yield of furoic acid isolated was 87.1 per cent of theory.

EXAMPLE 3

Preparation of catalyst 31.9 parts of ferric oxide powder ($Fe_2O_3$, Baker's C. P.) were suspended in 500 parts of boiling water. To this was added first 1.0 part of sodium hydroxide, and then 0.5 part of silver nitrate in 20 parts of water. The resulting precipitate was washed twice by decantation and used as a catalyst as indicated below.

Oxidation of furfural to furoic acid

The oxidation was carried out with the above catalyst in the same manner as described in Example 1. The yield of furoic acid isolated was 92 per cent of theory (on an ash free basis). 0.02 part of furfural was recovered.

EXAMPLE 4

Preparation of catalyst 47 parts of nickelous carbonate
 ($2NiCO_3.3Ni(OH)_2.4H_2O$—
 General Chemical Company)
were heated in a casserole to obtain a black oxide. 16.5 parts of the oxide thus formed were suspended in 500 parts of boiling water containing 1.0 part of so-dium hydroxide and to this was added, with stirring, 0.5 part of silver nitrate in 20 parts of water. The resulting precipitate was washed and used as a catalyst as indicated below.

Oxidation of furfural to furoic acid

The oxidation was carried out with the above catalyst in the same manner as described in Example 1. The yield of furoic acid isolated was 91 per cent of theory.

EXAMPLE 5

Preparation of catalyst 50 parts of copper sulfate ($CuSO_4.5H_2O$), 0.5 part of silver nitrate and 5.0 parts of cerium nitrate ($Ce(NO_3)_3.6H_2O$) were dissolved in 1500 parts of hot water and heated to boiling. To the boiling mixture was added, while stirring, 19 parts of sodium hydroxide in 500 parts of water. The precipitate was washed by decantation and used as a catalyst as described below.

Oxidation of furfural to furoic acid

The above catalyst was suspended in a sodium hydroxide solution composed of 4.1 parts of sodium hydroxide in 500 parts of water. While air was bubbled in continuously by means of a gas disperser 9.6 parts of furfural were added. The reaction was maintained at 55° C.±5° for 2 hours. The yield of furoic acid isolated was 96 per cent based on unrecovered furfural. 0.47 part of furfural was recovered.

EXAMPLE 6

Preparation of catalyst 32.0 parts of antimony pentoxide ($Sb_2O_5$—Coleman and Bell) were suspended in 500 parts of boiling water. To this was added 1.0 part of sodium hydroxide and then 0.5 part of silver nitrate in 20 parts of water. The precipitate was washed by decantation and used as a catalyst as indicated below.

Oxidation of furfural to furoic acid

The oxidation was carried out with the above catalyst in the manner described in Example 1. The yield of furoic acid isolated was 82 per cent based on unrecovered furfural. 0.33 part of furfural was recovered.

Example 7

Preparation of catalyst 50 parts of copper sulfate ($CuSO_4.5H_2O$) and 1.0 part of potassium chloroplatinite (Eimer and Amend) were dissolved with stirring in 1000 parts of boiling water. Then 17 parts of sodium hydroxide in 500 parts of boiling water were added with vigorous stirring. The precipitate was washed well by decantation and used as a catalyst as indicated below.

Oxidation of furfural to furoic acid

The oxidation was carried out with the above catalyst in the same manner as described in Example 1. The sodium hydroxide and furfural were added over a period of 1 hour and 15 minutes. The yield of isolated furoic acid was 86 per cent based on unrecovered furfural. 0.1 part of furfural was recovered.

Example 8

Preparation of catalyst 50 parts of copper sulfate ($CuSO_4.5H_2O$) and 0.5 part of gold trichloride (Eimer and Amend, C. P.) were dissolved in 1000 parts of water and heated to boiling. To this was added slowly and with vigorous stirring 17 parts of sodium hydroxide in 500 parts boiling water. The precipitate obtained was washed well by decantation and used as a catalyst as indicated below.

Oxidation of furfural to furoic acid

The oxidation was carried out with the above catalyst in the same manner as described in Example 1, except oxygen was passed in for an additional 25 minutes. The yield of isolated furoic acid was 77.5 per cent based on unrecovered furfural. 0.2 part of furfural was recovered.

Example 9

Preparation of catalyst 50 parts of copper sulfate ($CuSO_4.5H_2O$) and 0.5 part of palladium chloride (Eimer and Amend, C. P.) were dissolved in 1200 parts of boiling water. To this solution was added slowly and with vigorous stirring 17 parts of sodium hydroxide in 500 parts of boiling water. The precipitate was washed by decantation and used as a catalyst as indicated below.

Oxidation of furfural to furoic acid

The oxidation was carried out with the above catalyst in the same manner as described in Example 1. The yield of isolated furoic acid was 81 per cent based on unrecovered furfural. 0.13 part of furfural was recovered.

Example 10.—Superatmospheric Pressure Run

Preparation of catalyst

The catalyst was prepared as described in Example 3. The amounts of components were: iron oxide ($Fe_2O_3$)—640 parts; silver nitrate ($AgNO_3$)—10 parts; sodium hydroxide—10 parts.

Oxidation of furfural to furoic acid

The reaction was carried out in a pressure unit in which the charge could be vigorously agitated. The above catalyst was suspended in 10,000 parts of water containing 780 parts of sodium hydroxide. Oxygen pressure was applied and maintained at 25–30 pounds per square inch during the run. Furfural was pumped in at the rate indicated.

| Time in minutes | Temperature in degrees C. | Total furfural added in parts |
| --- | --- | --- |
| 0 | 36 | 0 |
| 4.5 | 37.5 | 58 |
| 9.5 | 41 | 116 |
| 15.5 | 44 | 174 |
| 21.5 | 47 | 232 |
| 27.5 | 49.5 | 290 |
| 37.5 | 53 | 406 |
| 59 | 53 | 580 |
| 65 | 55 | 638 |
| 88 | 57 | 870 |
| 114 | 59 | 1,160 |
| 138.5 | 60 | 1,450 |
| 164.5 | 60 | 1,740 |

After all the furfural had been added the oxygen pressure was maintained for an additional 10 minutes. A yield of 96 per cent (on an ash free basis) of theory of furoic acid was isolated. 4.58 parts of furfural were recovered.

It is not intended that this invention be restricted to the use of catalysts having the exact compositions described in the foregoing examples. The percentage of each component may be varied over a wide range with satisfactory results. The following table shows the effect of varying the percentages of silver oxide and iron oxide ($Fe_2O_3$) when used as the components of a catalyst in the oxidation of furfural to furoic acid.

| Percent silver oxide | Per cent iron oxide | Yield of furoic acid in per cent |
| --- | --- | --- |
| 1 | 99 | [1] 92 |
| 10 | 90 | 97.2 |
| 35 | 65 | 93.4 |
| 50 | 50 | 95.0 |

[1] Ash free.

While I have not tried all the possible combinations of mixtures of the oxides of two or more base metals with all the possible combinations of mixtures of the oxides of two or more noble metals, it may be expected that any combination of the metal oxides described herein will work satisfactorily. In general, it is preferred that the catalyst comprise a major proportion of base metal oxide and a minor proportion of noble metal oxide.

I have indicated in the foregoing that sulfuric acid may be advantageously used to convert the furoic acid salt to furoic acid in the reaction mixture. It will be understood, of course, that other strong inorganic or organic acids may be used for this purpose, suitable acids being hydrochloric acid, nitric acid, acetic acid, trichloracetic acid, etc.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. Process for producing furoic acid from furfural which comprises suspending furfural and a catalyst comprising a major proportion of a base metal oxide and a minor proportion of a noble metal oxide in an aqueous medium maintained in an alkaline-reacting condition while supplying an excess of elemental oxygen thereto to oxidize the furfural to a salt of furoic acid; acidifying the resulting solution to liberate the furoic acid therefrom; and recovering the latter.

2. The process according to claim 1 in which the base metal oxide is that of copper.

3. The process according to claim 1 in which the base metal oxide is that of iron.

4. The process according to claim 1 in which the base metal oxide is that of nickel.

5. The process according to claim 1 in which the noble metal oxide is that of silver.

6. The process according to claim 1 in which the base metal oxide is that of iron and the noble metal oxide is that of silver.

7. The process of claim 1 when carried out within the temperature range of from about 35° C. to about 100° C.

8. Process of producing a furoate from furfural which comprises incrementally introducing furfural into an aqueous solution of an alkaline material containing suspended therein a catalyst consisting of a mixture of a major proportion of a base metal oxide and a minor proportion of a noble metal oxide while continuously blowing an oxygen-containing gas through the suspension and maintaining the alkalinity of the solution by incremental addition of an alkaline-reacting material thereto, whereby the furfural is oxidized to furoic acid by said oxygen, said acid combining with the alkaline material to form the furoate.

9. Process according to claim 8, in which the base metal oxide is that of iron.

10. Process according to claim 8, in which the noble metal oxide is that of silver.

11. Process according to claim 8, in which the oxygen-containing gas is air.

ANDREW P. DUNLOP.